United States Patent [19]

Cooper et al.

[11] Patent Number: 5,177,385
[45] Date of Patent: Jan. 5, 1993

[54] AIR GAP BAFFLE RING FOR A DYNAMOELECTRIC MACHINE

[75] Inventors: Glenn D. Cooper, Orlando; Harry S. Loh, Jr., Casselberry, both of Fla.

[73] Assignee: Westinghouse Electric Corp., Pittsburgh, Pa.

[21] Appl. No.: 856,419

[22] Filed: Mar. 23, 1992

[51] Int. Cl.⁵ .................... H02K 9/00; H02K 9/08; H02K 3/46
[52] U.S. Cl. ........................ 310/53; 310/260
[58] Field of Search .............. 310/52, 53, 55, 57, 310/58, 59, 60 R, 64, 260

[56] References Cited

U.S. PATENT DOCUMENTS

| | | | |
|---|---|---|---|
| 2,626,365 | 1/1953 | Baudry et al. | 310/55 |
| 2,653,255 | 9/1953 | Baudry et al. | 310/64 |
| 3,110,827 | 8/1960 | Baudry | 310/55 |
| 3,413,499 | 11/1968 | Barton | 310/58 |
| 3,969,643 | 7/1976 | Säpper | 310/53 |
| 4,051,400 | 9/1977 | Armor et al. | 310/58 |
| 4,118,645 | 10/1978 | Calfo et al. | 310/53 |
| 4,315,173 | 2/1982 | Calfo et al. | 310/53 |
| 4,324,993 | 4/1982 | Sato et al. | 310/58 |
| 4,379,975 | 4/1983 | Kitajima | 310/59 |
| 4,508,985 | 4/1985 | Pavlik et al. | 310/55 |
| 4,546,279 | 10/1985 | Hammer et al. | 310/59 |
| 4,609,840 | 9/1986 | Eats et al. | 310/58 |
| 4,654,550 | 3/1987 | Lowther et al. | 310/59 |
| 4,682,064 | 7/1987 | Crounse et al. | 310/59 |
| 4,751,412 | 6/1988 | Lowther et al. | 310/52 |

FOREIGN PATENT DOCUMENTS

| | | | |
|---|---|---|---|
| 0096847 | 6/1984 | Japan | 310/55 |
| 0190233 | 9/1989 | Japan | 310/57 |
| 1457080 | 2/1989 | U.S.S.R. | 310/55 |

Primary Examiner—Steven L. Stephan
Assistant Examiner—C. LaBalle
Attorney, Agent, or Firm—Michael G. Panian

[57] ABSTRACT

A simplified, readily removable air gap baffle ring for a gas cooled dynamoelectric machine, such as a turbine generator. The baffle ring comprises two composite rings with a seal material sandwiched therebetween and bonded into a single ring structure. The seal ring attaches to finger plate extensions which are an integral part of the generator core, and forms an air gap seal between the rotor retaining ring and end wedges which extend from the stator coil slots. The air gap baffle assembly of the present invention effectively seals the high pressure zone of the exciter end of the generator, from the lower pressure radial air gap zone located between the generator rotor and stator, to thereby force cooling gas to flow into the rotor and stator.

9 Claims, 5 Drawing Sheets

FIG. 8.
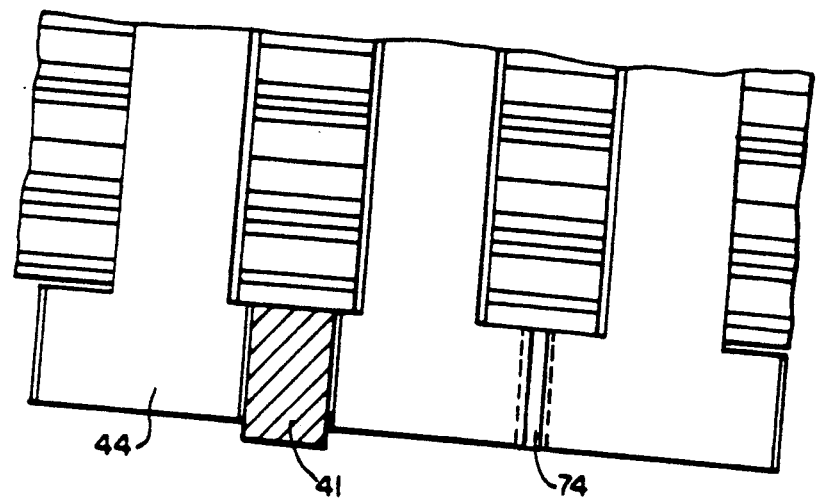
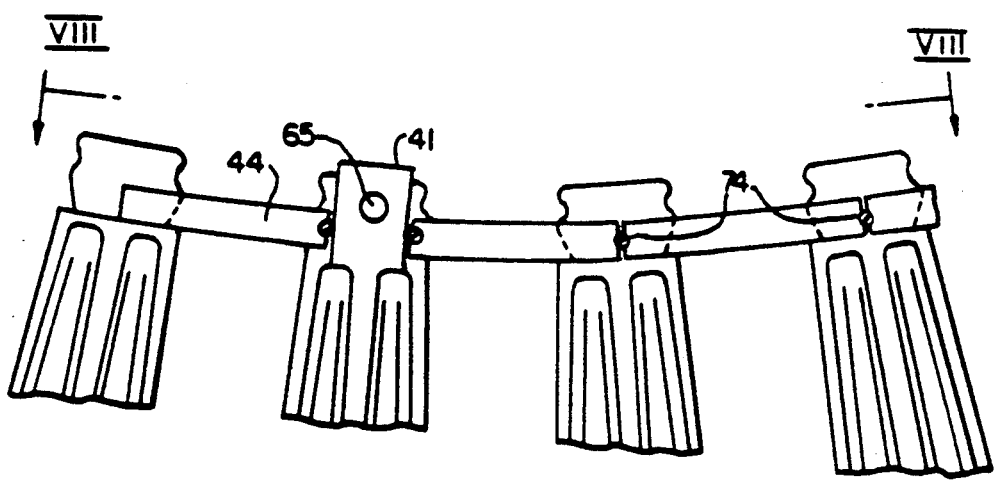
FIG. 7.

AIR GAP BAFFLE RING FOR A DYNAMOELECTRIC MACHINE

TECHNICAL FIELD

The invention relates to a dynamoelectric machine having an air gap baffle assembly, and more particularly to a removably attachable air gap baffle ring.

BACKGROUND OF THE INVENTION

As is well known in large dynamoelectric machines such as turbine generators, heat is generated therein during normal operation. To keep the machine operating within desirable temperature limits, a cooling gas such as hydrogen, is forced through the machine to carry away the generated heat. Most large turbine generators have incorporated in their design provisions for the necessary blower assemblies, heat exchangers, and passageways to ensure adequate circulation of the cooling gas which maintains the temperature of the machine during operation within the acceptable limits. In order to keep the region of the rotor winding, stator core and stator coils cool, gas must be directed through passages in these areas.

On inner cooled generators, the gas going into to rotor from both ends discharges into the air gap at the axial midpoint of the rotor and then travels to the blower at one end of the rotor where it is recirculated. Inner cooled stator coils receive gas at end which discharges into the blower at the other end. The stator core may be cooled by gas flowing axially through holes in the core or by gas flowing radially from outer diameter to inner diameter through radial vents in the core. In all cases, gas is to be prevented from bypassing these paths and flowing directly into the air gap. This is typically accomplished by an air gap barrier at one end of the generator.

Typically, the air gap baffle assembly is secured to the generator stator in the exciter end of the generator. Examples of such air gap baffle assemblies are U.S. Pat. Nos. 4,118,645; 4,315,173; and 4,654,550, each of which is assigned to the present assignee and incorporated herein by reference. Typically, these baffle assemblies comprise more than one component requiring an extended installation procedure. See, for example, FIG. 9. Additionally, some prior art designs comprise a two-piece design, wherein a first ring or member is secured to stator coils at the end region, and a removable element which bolts to the outer ring. Typically for removal of the rotor with these prior art designs, one or more pieces of the baffle assembly would need to be removed prior to insertion or removal of the rotor. Hence, installation and removal procedures for these prior art systems often involve time-consuming processes each time the rotor was inserted or removed in the generator core. Moreover, it is not uncommon for one or more segments of the air gap baffle assembly, which remain in place during rotor removal, to become damaged, thereby necessitating repair and/or replacement of those segments.

SUMMARY OF THE INVENTION

What is needed, then, is a simplified air gap baffle assembly which can be removably attached to the stator core to facilitate rotor insertion and removal.

The above and other objects are attained by the present invention, according to which, briefly stated, a dynamoelectric machine such as a turbine generator, comprises a generally cylindrical stator core having a plurality of axial slots therein. Each of the slots includes a stator winding having end turns which extend axially from the stator core. Rotatably mounted within an axial bore of the stator core is a generally cylindrical rotor. The rotor is radially spaced from the stator core to define an axial air gap between the rotor and the core. An air gap baffle ring is provided to minimize flow of a coolant gas into the air gap. The air gap baffle ring includes an annular first ring and an annular second ring having an annular seal material disposed therebetween. The annular seal material preferably has an inner diameter less than that of the first and second ring segments and projecting into the air gap to provide a practical minimal clearance from the rotating part. The air gap baffle ring of the present invention is readily removably attachable to the stator core itself, to provide for ease of insertion and removal of the generator rotor.

Preferably the air gap baffle ring is comprised of two 180° segments, which segments are adapted to pass over the rotor, in a disassembled state, so that the rotor need not be removed for installation of the air gap baffle ring.

BRIEF DESCRIPTION OF THE DRAWINGS

Various other objects, features and advantages of the invention will become more apparent by reading the following detailed description in conjunction with the drawings, which are shown by way of example only, wherein:

FIGS. 7 and 8 are an arcuate sectional view of the core showing the attachment of the present invention to slot wedges inserted in the core.

DESCRIPTION OF THE PREFERRED EMBODIMENTS

Figure 1:
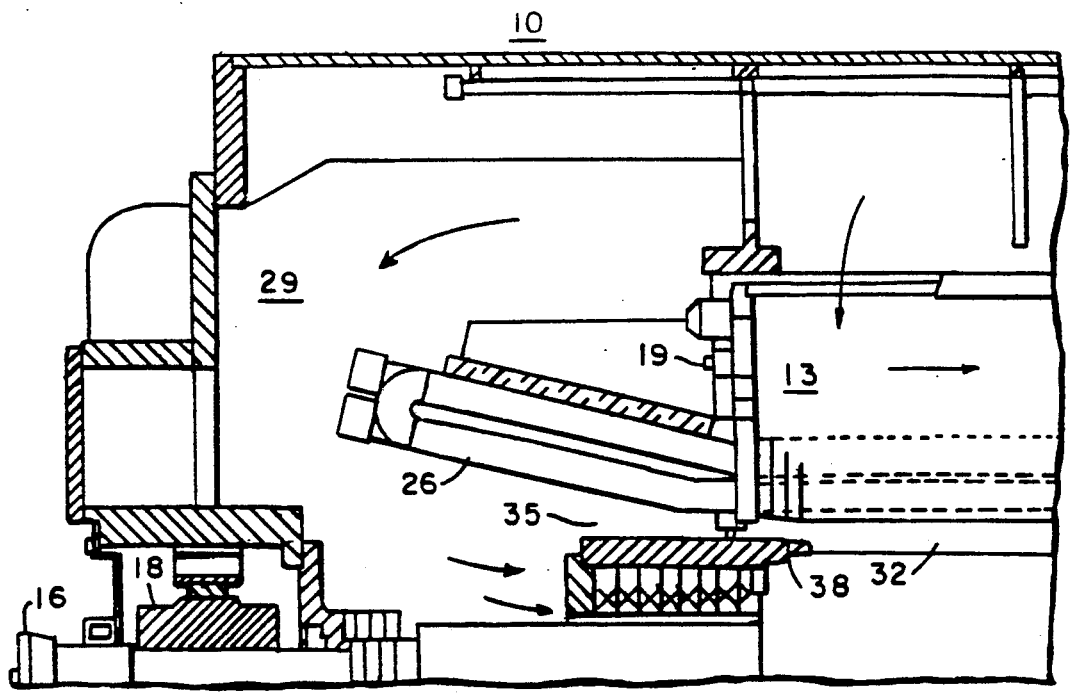
FIG. 1 is a view, partially in cross section, of a large dynamoelectric machine, such as an electrical turbine generator.
Figure 9:
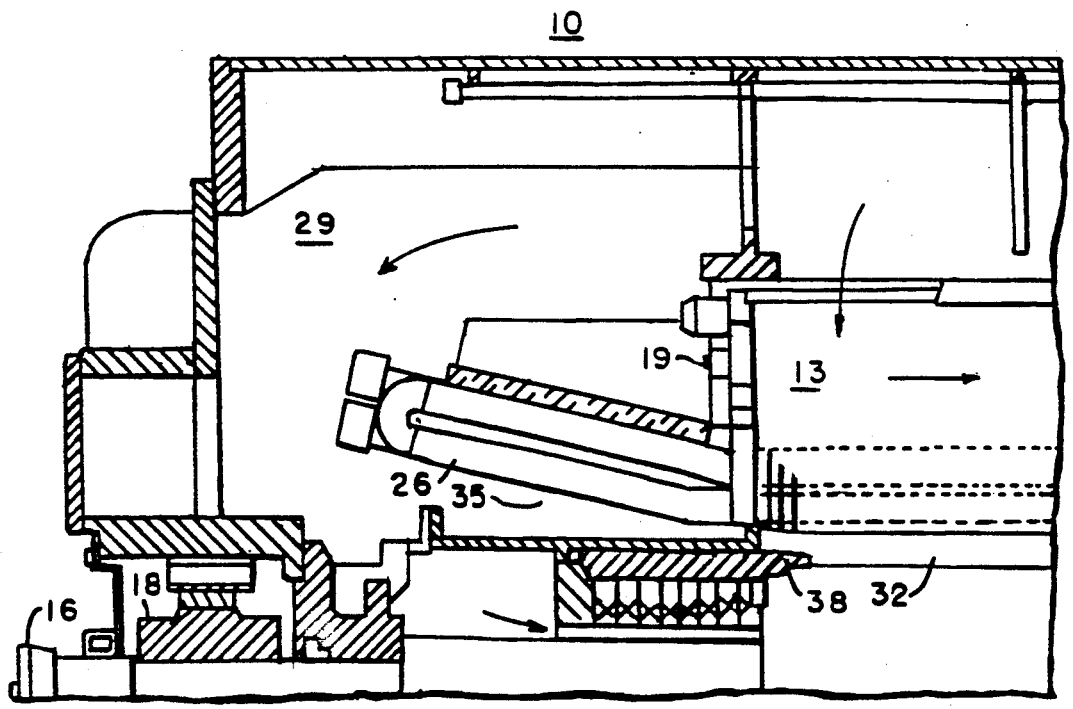
FIG. 9 is a typical prior art air gap baffle assembly.

Referring now to the drawings in detail, wherein like numerals identify similar elements throughout, FIG. 1 is a view partially in cross section of a typical dynamoelectric machine 10, such as a large turbine generator, including a stator core 13 having a rotor 16 rotatably mounted within a bore 17 on bearings 18. The stator core is typically made up of a plurality of thin laminations (not shown) which are secured together by elongated longitudinal bolts 19 which pass through openings in the laminations. An end plate 22 and a finger plate 23 are typically provided to facilitate the rigid clamping of the stator core 13. Passing within slots (not shown) which axially extend along the stator core, are the stator core windings 26. In the end region of the core, the windings project through the stator core to provide the necessary electrical connections for the generator. Between the generally cylindrical rotor 16 and the bore 17 of the stator core 13, the radial space therebetween is referred to as the air gap 32, which extends the axial length of the generator 10.

An air gap baffle ring 35 of the present invention is fastened to the stator core to restrict the opening into the air gap region 32. The air gap baffle ring is provided to ensure that circulation of a coolant gas, such as hydrogen, is circulated through the generator stator 13, the stator coils 26 and the rotor 16 prior to flow through the air gap 32. Typically, the coolant gas is provided at a high pressure at the exciter end 29 of the generator 10, and the air gap baffle is used to separate this high pressure zone from the air gap zone which is a lower pressure region. In this manner, it is assured that the high pressure gas will flow through all the components within the generator to provide for adequate cooling thereof. Windings (not shown) are also provided within the rotor 16, the end portion of the windings being secured to the rotor by means of a rotor retaining ring 38.

Figure 2:
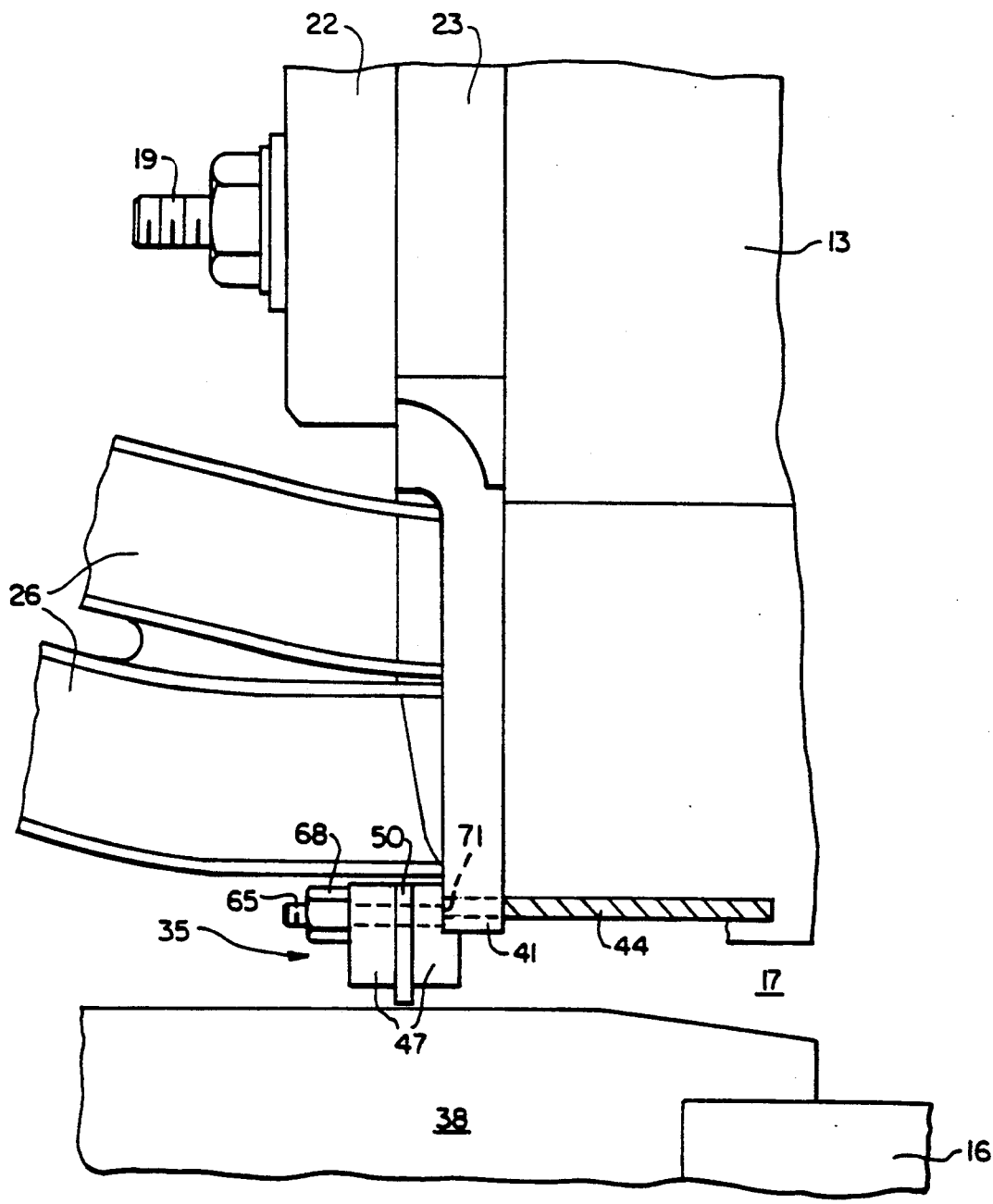
FIG. 2 is an enlarged view of the exciter end of the core region, showing the installed device of the present invention.
Figure 3:
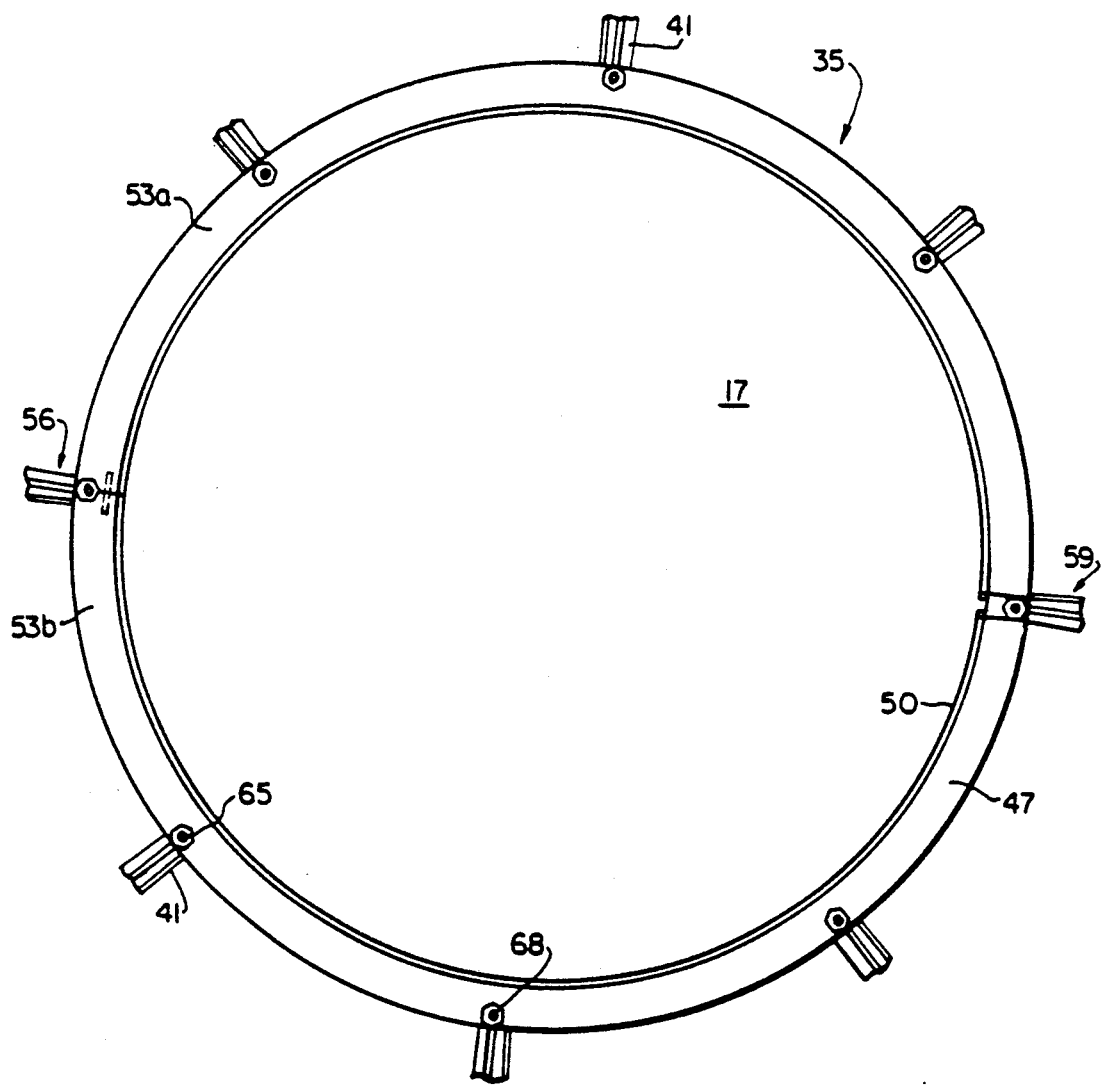
FIG. 3 is a view of the air gap baffle ring of the present invention as viewed from the exciter end of the generator.
Figure 4:
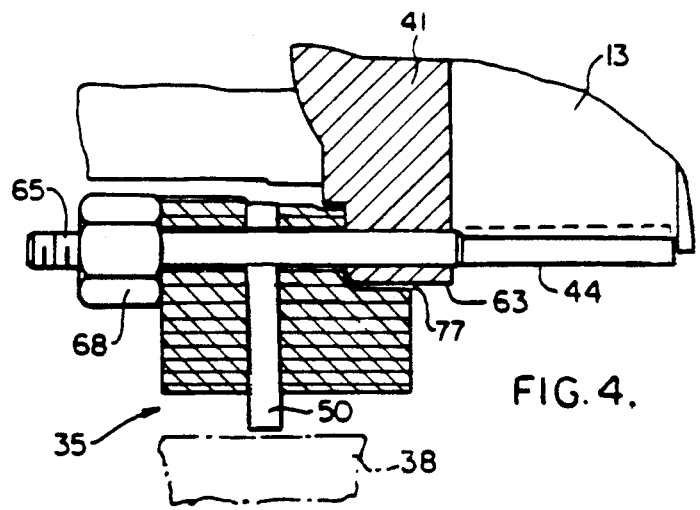
FIGS. 4, 5 and 6 are representative of the means of attaching the present invention to the generator core.
Figure 5:
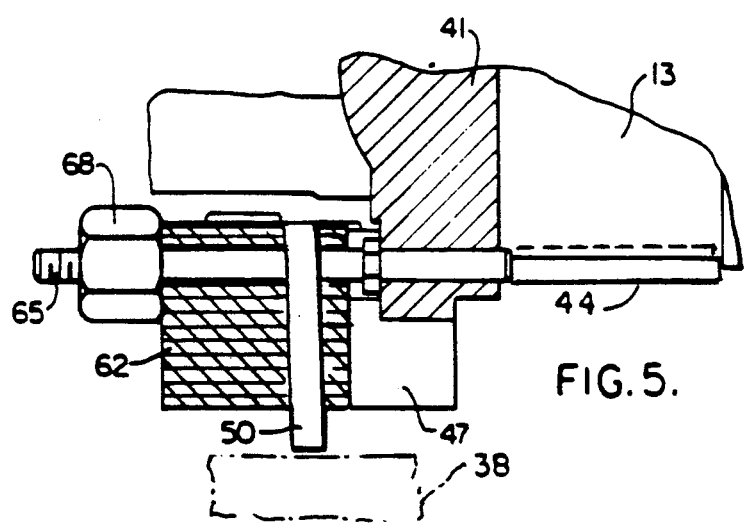
Figure 6:
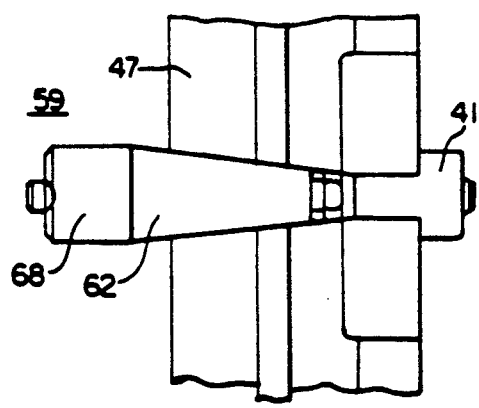

As shown in greater detail on the enlarged view of FIG. 2, the finger plates 23, of which there may be eight or nine in a typical large dynamoelectric machine, have extension lugs 41 which radially extend from the region of the stator core toward the rotor body and thus into the air gap 32. Moreover, stator coil wedges 44 which are utilized to secure the windings 26 within the core region, axially extend from the core toward the finger plate extensions 41 and butt against the seal ring 35. The air gap baffle ring 35 of the present invention is removably secured to the finger plate extensions, which have a threaded stud 65 therethrough, to attach the air gap baffle ring.

Referring now in particular to FIGS. 3 through 6, the assembly of the air gap baffle ring 35 within the turbine generator 10 will be discussed in detail. Preferably, the air gap baffle ring is composed of two composite rings 47 having a seal material 50 sandwiched between and then bonded into a single ring. It is preferred that the seal material be a material, such as a fluorocarbon polymer (an example of which is Teflon ®) that will wear away rather than score or overheat the retaining ring of the rotor 16 in case of a rub between the rotor retaining ring 38 and the air gap baffle ring 35. Preferably, the first and second ring elements which are clamped on either side of the seal material 50 are a structural material of a glass epoxy or other suitable nonmetallic composite material.

Preferably, the air gap baffle ring 35 is comprised of two 180° arc segments 53a, 53b to allow assembly around the retaining ring 38 when the rotor 16 is in place. One side 56 of the two segments is pinned while the other 59 is tapered to receive a wedge 62 used to expand the ring in place until it makes radial contact with a number of finger plate lugs 41 (or tabs) extending into the air gap 32, which position the air gap baffle ring 35 with respect to the rotor and core axial centerline. When the air gap baffle ring of the present invention is in place and expanded, it provides a tight radial connection against the inside diameter of the finger plate extension tabs and tightly against the machined face 63 thereof. The ring 35 is preferably held in place by stainless steel studs 65 which project axially from the tab extensions through axial holes in the ring. Nonmetallic nuts 68 are threaded onto the studs to press the ring 35 against the face of the tabs. One of these nuts (see FIGS. 5 and 6) presses against a split wedge 62 which expands the ring and remains there as an integral part of the assembly. With the air gap baffle ring in place, the Teflon ® seal ring 50 has a bore concentric with the bore 17 of the stator core 13 to form a preset clearance with the rotor retaining ring 38.

Preferably, the seal of the air gap region 32 is completed by T-shaped coil slot wedges 44 which extend axially outward from the stator coil wedge slots to the seal ring. They are positioned to form, essentially, a zero clearance gap 71 at the seal ring, as shown in FIG. 2. These pieces seal against the core inner diameter, thus forming a gas-tight seal between adjacent wedges 44 by the injection of a silicon rubber sealant 74 into holes formed by semicircular grooves in the sides of each wedge. Seals can be similarly made between wedges on either side of the finger plate tabs 41.

To install the baffle ring 35 of the present invention in a generator core, the method comprising the following steps is preferably followed. The two 180° segments 53a, 53b of the air gap baffle ring are assembled onto the stainless steel studs 65 axially extending from the finger plate extensions 41. The ring expansion wedge 62 is installed. The wedge is installed between the two segments of the baffle ring 35 until the outer diameter 77 of the baffle ring makes contact with substantially all of the finger plate lugs; e.g., where there are eight finger plates 23 in the generator core assembly, the baffle ring should preferably make contact with all eight finger plate extensions 41. When the ring is thus in place, a nut 68 is installed behind the split wedge 62 onto the threaded portion of the stud and torqued into position such that the full expanded ring 35 makes contact with all lugs. When the expansion wedge is thus secured, the remaining nuts 68 are installed onto the stainless steel studs of the rest of the finger plate extensions 41.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention which is to be given the full breadth of the appended claims and in any and all equivalents thereof.

What is claimed is:

1. A dynamoelectric machine comprising:
   a generally cylindrical stator core having a plurality of axial slots therein, each of said slots including a stator winding containing end turns axially extending from the stator core, each of said slots having a wedge axially inserted therein for securing the stator winding in said slot, said wedges having a cross member extending axially outward from said slot, said stator core having an axial bore therethrough;
   a generally cylindrical rotor rotatably mounted within the axial bore of said stator core and radially spaced therefrom to define an axial air gap between the rotor and the stator core;
   an air gap baffle ring to control flow of a coolant gas through the air gap, the air gap baffle ring including an annular first ring element in abutting relationship with the cross member of said wedges, an annular second ring element, and an annular seal material disposed between said first and second ring elements, said annular seal material having an inner diameter lesser than that of said first and second ring elements; and
   means for removably attaching the air gap baffle ring to the stator core.

2. The dynamoelectric machine as recited in claim 1, wherein said means for removably attaching the air baffle ring comprises a plate attached to the stator core, the plate including an extension which projects into the air gap, the air gap baffle ring being removably secured to the plate.

3. The dynamoelectric machine as recited in claim 1, wherein the air gap baffle ring is further comprised of at least two arcuate segments, said arcuate segments adapted to pass over the rotor when said segments are disassembled.

4. The dynamoelectric machine as recited in claim 1, wherein the annular seal material is comprised of fluorocarbon polymer.

5. A generator comprising:
a generally cylindrical stator core having a plurality of axial slots therein, each of said slots including a stator winding containing end turns axially extending from the stator core, each of said slots having a wedge inserted therein for securing the stator winding in said slot, said wedges having a cross member extending axially outward from said slot, said stator core having an axial bore therethrough;
a generally cylindrical rotor rotatably mounted within the axial bore of said stator core and radially spaced therefrom to define an axial air gap between the rotor and the stator core;
a plurality of finger plates attached to the stator core, each of said plates including an extension which projects into the air gap and between cross member of said wedges; and
baffle means removably secured to said finger plates to control flow of a coolant gas through the air gap, wherein said baffle means is in abutting relationship with said cross members and said finger plates to seal the air gap.

6. The generator as recited in claim 5, wherein said baffle means is further comprised of at least two arcuate segments, said arcuate segments adapted to pass over the rotor when said segments are disassembled.

7. The generator as recited in claim 5, wherein said baffle means includes an annular first ring element, an annular second ring element, and an annular seal material disposed between said first and second ring elements, said annular seal material having an inner diameter lesser than that of said first and second ring elements.

8. The generator as recited in claim 5, wherein there are eight finger plates attached to the stator core.

9. The generator as recited in claim 7, wherein the annular seal material is comprised of fluorocarbon polymer.

* * * * *